(12) United States Patent
Åström et al.

(10) Patent No.: US 6,478,118 B2
(45) Date of Patent: Nov. 12, 2002

(54) HANDLE FOR OPERATING A PARKING BRAKE

(75) Inventors: Peter Åström, Råneå (SE); Daniel Berglund, Piteå (SE)

(73) Assignee: Volvo Personvagnar AB (SE)

( * ) Notice: Subject to any disclaimer, the term of this patent is extended or adjusted under 35 U.S.C. 154(b) by 31 days.

(21) Appl. No.: 09/681,427

(22) Filed: Mar. 31, 2001

(65) Prior Publication Data

US 2001/0032760 A1 Oct. 25, 2001

Related U.S. Application Data

(63) Continuation of application No. PCT/SE99/01743, filed on Oct. 1, 1999.

(51) Int. Cl.$^7$ ............................................. B60T 15/14
(52) U.S. Cl. ............... 188/1.11 E; 303/20; 74/501.512; 74/625
(58) Field of Search ............... 74/388 R, 471 R, 74/501.5 R, 625; 188/1.11 E, 2 D, 156, 158, 162; 303/20

(56) References Cited

U.S. PATENT DOCUMENTS 6,079,794 A * 6/2000 Drott ........................... 303/20
6,213,259 B1 * 4/2001 Hanson et al. ............... 188/156

FOREIGN PATENT DOCUMENTS

| DE | 19523590 A1 | 1/1997 |
| EP | 0586598 | * 12/1994 |
| WO | WO 984131 A1 | 9/1998 |

* cited by examiner

Primary Examiner—Christopher P. Schwartz
(74) Attorney, Agent, or Firm—Howrey Simon Arnold & White LLP

(57) ABSTRACT

A knob arrangement for operating parking brakes intended for use in vehicles comprising brake units and an electrically operated tensioning device for applying or releasing braking force to the brake units. According to the invention, a device is arranged to sense the position of the knob and to send control signals to a first electric motor which is arranged to power the tensioning device for generating a braking force corresponding to the position of the knob. The knob is manually adjustable and, in a fully applied position, at maximum braking force, mechanically lockable. A control motor is arranged to automatically displace the knob to the fully applied and mechanically locked position dependent on second control signals applied to the motor. In its fully applied, locked position the knob is only releasable from the locked position by manual operation.

10 Claims, 11 Drawing Sheets

HANDLE FOR OPERATING A PARKING BRAKE

CROSS REFERENCE TO RELATED APPLICATIONS

This is a continuation patent application of International Application Number PCT/SE99/01743 filed Oct. 1, 1999 which designates the United States; the disclosure of that application is expressly incorporated by reference in its entirety.

BACKGROUND OF THE INVENTION

Field of the invention. The present invention relates to a knob arrangement for operating parking brakes intended for use in vehicles comprising brake units such as drum brakes or disc brakes on two opposing wheels in a pair of wheels, and an electrically operated tightening means for applying or releasing braking force to said brake units.

Background Information. A large number of suggestions for electrically maneuvered parking brakes for replacing conventional hand controlled parking brakes are known in the art. For instance, electrically maneuvered hand brakes are described in GB 2304838 A, WO/9221542 and EP 0398546 A2.

SUMMARY OF THE INVENTION

The purpose of the present invention is to achieve an electrically operated parking brake offering a number of advantages compared to previously known designs. According to the invention this is achieved primarily by a means, suitably a rotary potentiometer, being arranged to sense the knob's position and send control signals to a first electric motor. The electric motor drives a tightening means, or tightener, for generating a braking force corresponding to the position of the knob. The knob is manually adjustable, and in its fully tightened position, at maximal braking force, capable of being locked mechanically. A control motor is arranged to automatically maneuver the knob to its fully tightened and locked position in response to incoming control signals. In its fully tightened and locked position, it is possible to release the knob from its locked position only through manual operation.

The present invention has several advantages, including the following. A great advantage of the knob as a maneuvering means in an electrical hand braking concept is its size. Because it is small in comparison to a traditional lever, it can be placed, for instance, in the middle console of the instrument panel thereby freeing room between the front seats of the car. Another advantage is that the control consists of few parts meaning that production costs can be kept low.

The maneuver force needed for the knob is significantly lower than is the case for conventional hand brakes. This means that a weak person will have no problem releasing an activated parking brake.

The risk of forgetting to set the hand brake on leaving the car is eliminated through an automatic application function on the knob control.

Because it is easy to design the knob/knob control as an independent unit that fits as a module in different car models, the number of variations of maneuvering units for different car models is reduced.

In static application, the function that entails moving the control axially and returning it a number of degrees increases child safety.

The knob functions well in dynamic braking because it is easy to maneuver.

BRIEF DESCRIPTION OF DRAWINGS

In the following detailed description, the invention will be described in more detail with reference to various embodiments shown in the attached drawings, comprised of the following figures.

DETAILED DESCRIPTION

Figure 1:
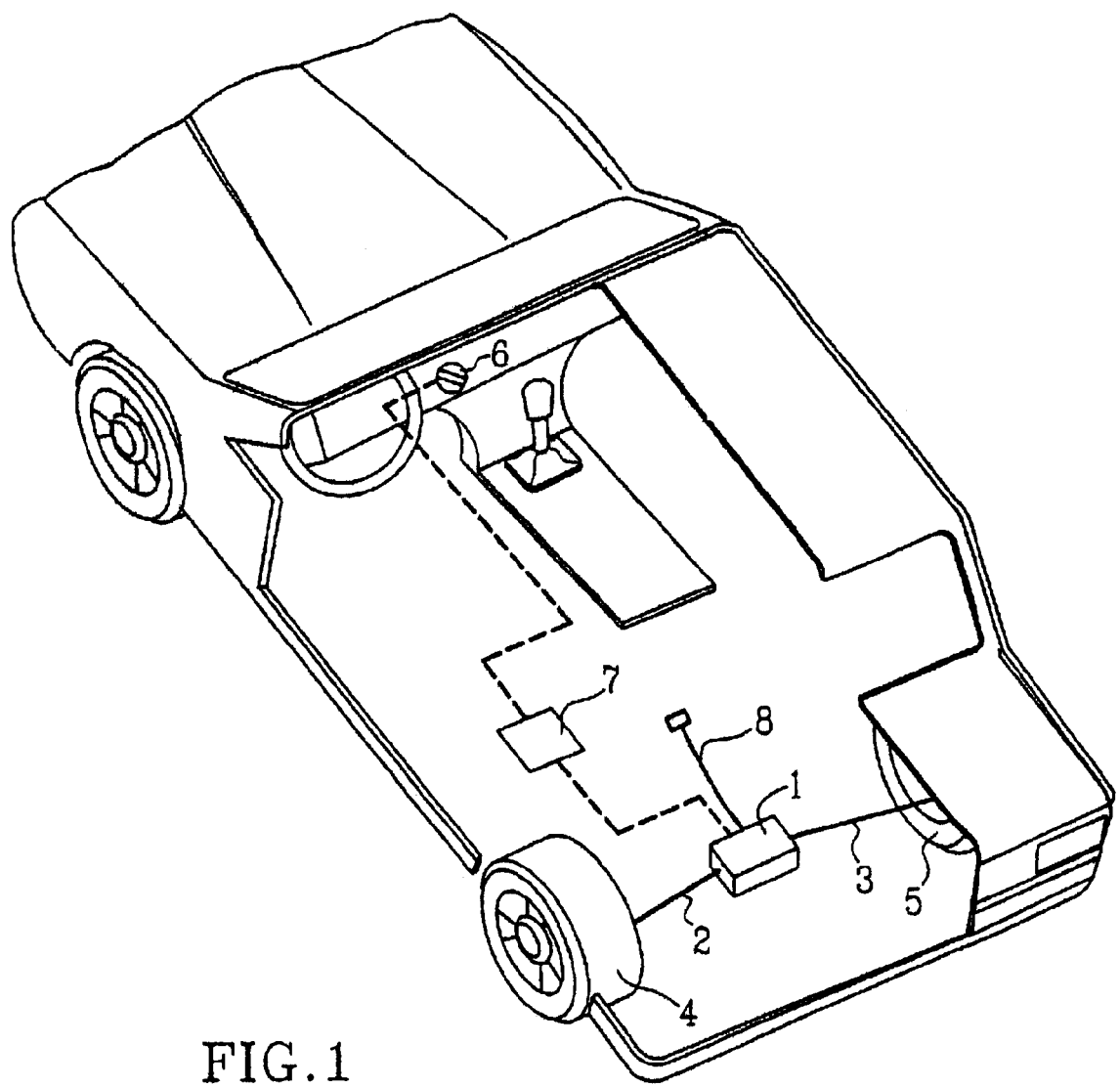
FIG. 1 is a schematic of a section through a car illustrating appropriate positioning of the main parts of the parking brake according to the present invention.

In FIG. 1 a plastic box 1 is illustrated having therein a brake activation unit. From that unit brake wires 2, 3 extend to brake units in the two wheels 4, 5. A knob 6 for operating the parking brake is arranged in the middle console of the car. The knob 6 and the activation unit in the plastic box 1 are coupled to an electric control unit 7. A mechanical release wire 8 available for manually releasing the brake in case of current failure or other electrical fault.

Figure 2:
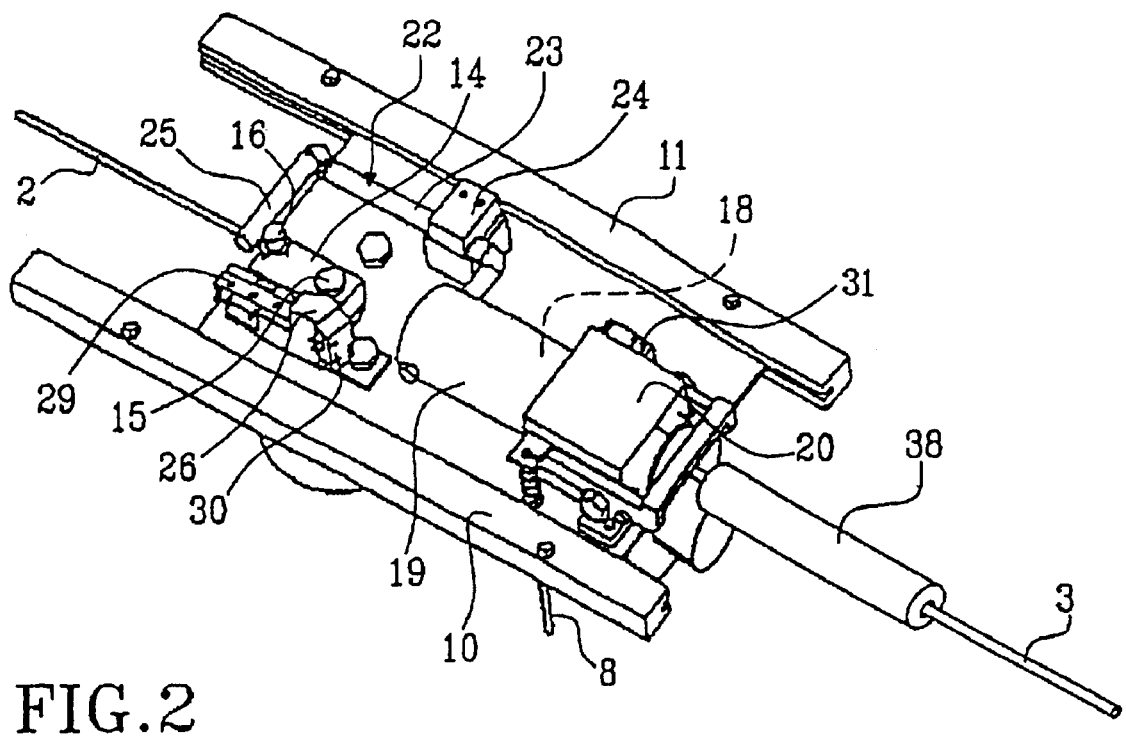
FIG. 2 is a top perspective view of the brake activation unit for activating the two brake units of a pair of wheels with the said activation unit in a position illustrating a released parking brake.
Figure 3:
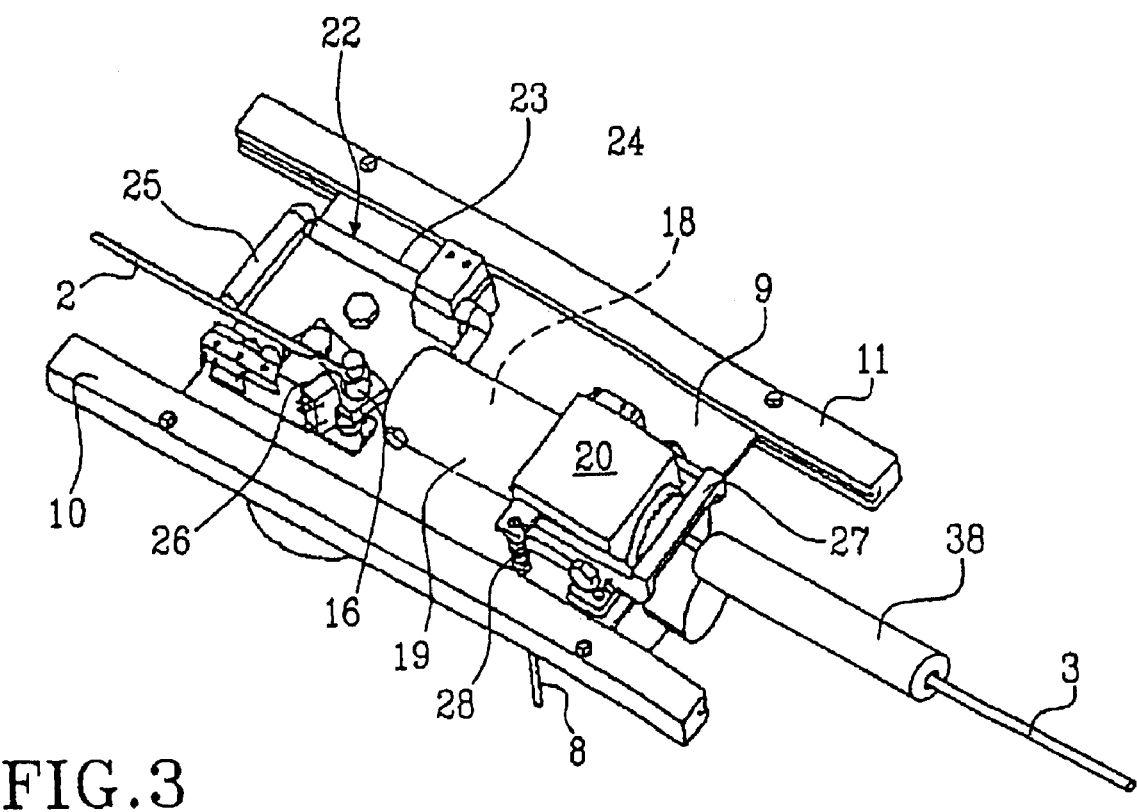
FIG. 3 a top perspective view of the brake activation unit according to FIG. 2 in a position illustrating an applied or set parking brake.
Figure 4:
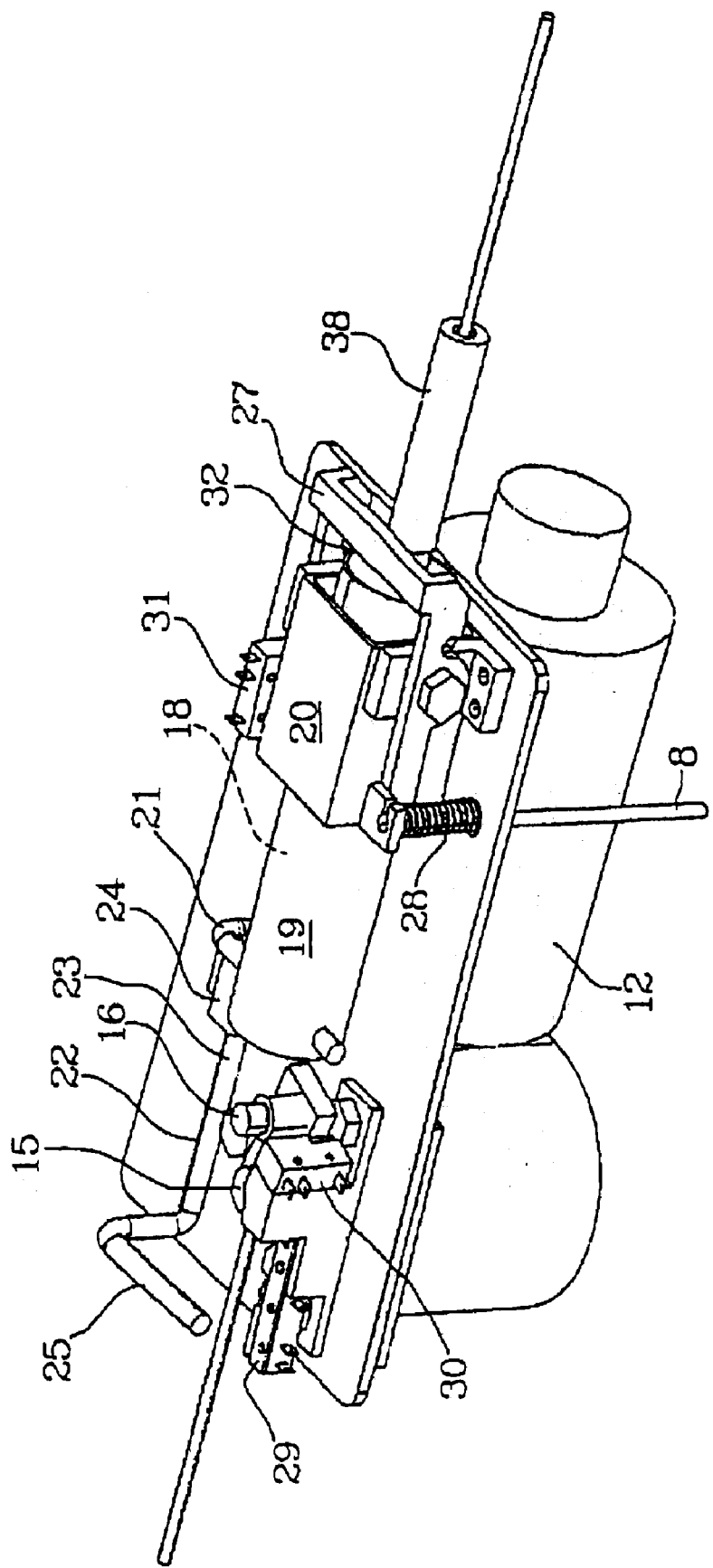
FIG. 4 is a side perspective view providing further details of the brake activation unit according to FIG. 3 without the guide rails.

Referring to FIG. 2–4, a slide plate 9 is shown. It is adjustably located in slide rails 10, 11 and is attached at one end to a first brake wire 2 and a second brake wire 3. On the slide plate 9 there is an electric motor 12 that, via its gearbox, drives a lever arm 14 rotatably attached to the slide plate 9. Its rotational axis is designated 15 in the drawings. On the free end of the lever arm 14 there is a projecting lever arm peg 16 to which the first brake wire 2 is attached. The other brake wire 3 is coupled to the slide plate 9 via a wire tensioner 38 and a spring package in which there is an energy storage spring 18 (see also FIG. 7) connected to the slide plate 9. The wire tensioner 38 can be equipped with a strain gauge (not shown).

In the spring package there is a cylinder 19 containing the spring 18. It is displaceably located in a cylinder guide 20 and attached by one end to a shank 21 on a bent rod in the following designated return 22, the middle pan 23 of which is displaceably attached to the slide plate 9 in a return holder 24. The return 22 has a second shank 25 on the other side of the lever arm peg 16 relative to the outer cylinder 19 of the spring package.

In the position shown in FIG. 2, the return's 22 second shank 25 lies against the lever arm peg 16, which projects above the other shank. In FIGS. 3 and 4, the lever arm 14 has swung from its unloaded original position shown in FIG. 2 and rests against a stop lug 26. In the position of the lever arm 14 shown in FIGS. 3 and 4, the spring package with the spring 18 is held in position on the slide plate 9 only by the lock 27, which in its normal position, the locked position, retains the outer cylinder 19 and takes up the tension in the other wire 3. Upon pulling the release wire 8, the lock 27 is lifted against the action of a pressure spring 28 out of its locking position. This manual mechanical release mechanism is described in more detail below in connection with FIGS. 5 and 6.

On the slide plate 9 there is a number of micro-switches. A first one 29 indicates the original position of the lever arm peg 16, a second one 30 indicates the final position of the lever arm peg, and a third one 31 indicates when the brake is mechanically released by means of the release wire 8.

The parking brake is released when the activation unit is in the position shown in FIG. 2. The electrical motor 12 is arranged to swing the lever arm 14 on activating the brake, whereby the lever arm peg 16 performs a clockwise rotational movement from its original position to its final position while simultaneously pulling the first wire 2 to stretch it. The slide plate 9, which is arranged to slide in the slide rails 10, 11, is moved by the first wire 2, with the reaction force taken up by the second wire 3. Accordingly, the same force is always applied to the two wires 2, 3. The gearbox of the electric motor 12 is self-braking, which means that the lever arm 14 can be stopped and held in any position. This makes dynamic braking with the parking brake possible.

When the vehicle is to be parked, the lever arm 14 is drawn to its final position as shown in FIGS. 3 and 4. In that position, the lever arm peg 16, and therefore the force vector of the wire 2, has passed the rotational center 15 of the lever arm 14, pressing the lever arm 14 against the stop lug 26 and holding it in that self-locking position. The system is adjusted so that a force somewhat greater than necessary is applied to the wires 2, 3. The energy storage spring 18, which is precompressed to the necessary application force, is thereby further compressed to compensate for force changes that can occur, for example, in connection with cooling of the brake discs. When the parking brake is applied, the lever arm 14 can be returned to its original position by the electric motor 12 in order to release the brake.

Figure 5:
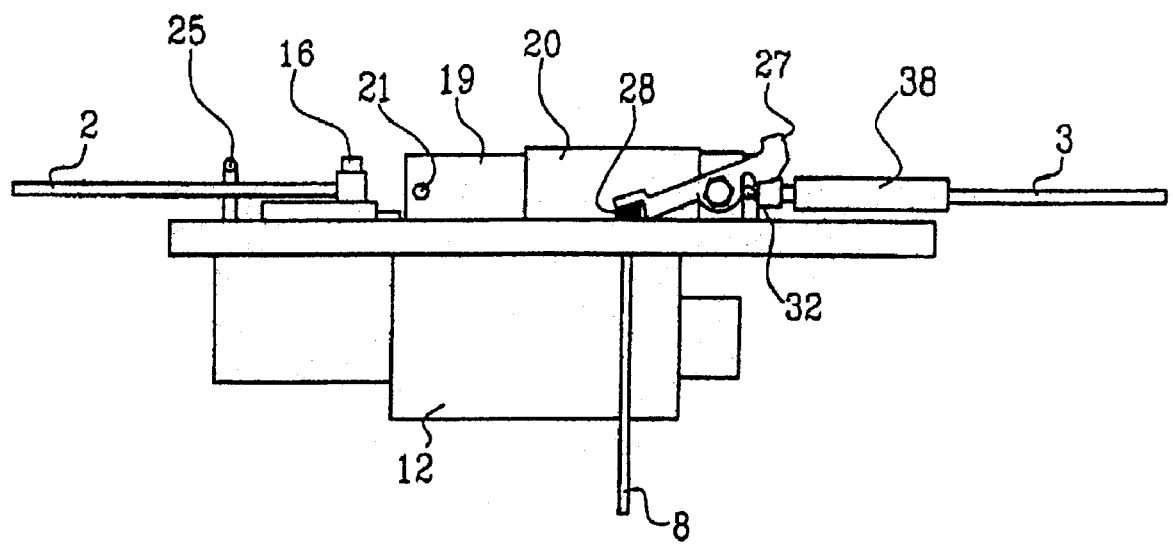
FIG. 5 is a side plane view of the brake activation unit according to FIG. 2 illustrating a mechanism for manual mechanical release of the parking brake when the brake has just been released.
Figure 6:
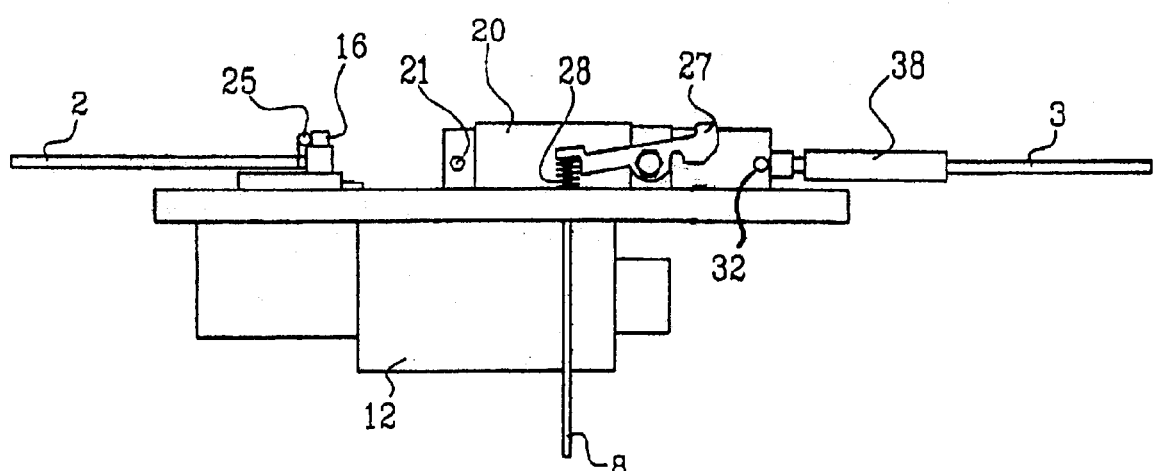
FIG. 6 is a side plane view of the brake activation unit according to FIGS. 2 illustrating a mechanism for manual mechanical release of the parking brake when the parking brake has been deactivated.

As mentioned above, in the activation unit there is a manual mechanical release mechanism with which the parking brake can be released if the electric motor does not work, for instance, due to a dead battery. The function of the release mechanism is most clearly apparent from FIGS. 5 and 6. In FIG. 5, the lock 27 has been lifted up out of engagement with lock pegs 32 on the outer cylinder 19 by pulling the release wire 8, whereby the cylinder 19 is released. The spring package can now be brought out of its previously fixed position shown in FIG. 5 by the force of the wire. When the cylinder slides in the cylinder guide 20, the slide plate 9 is also moved until the wires 2, 3 slacken and the parking brake is released.

The return 22 described above, which moves with the outer cylinder 19 when it is freed, comprises a connection between the energy storage spring and the lever arm 14 of the electric motor 12.

When the electric motor 12 is again functional and the lever arm 14 returns to its original position, the return 22 is pressed back by the lever arm plug 16 and the cylinder 19 is brought back to its original position as shown in FIG. 5. In that position the pressure spring 28 forces the lock 27 to engage against the outer cylinder. The parking brake is thus automatically made functional when the manual mechanical release mechanism is used and the electric motor 12 is again functional. A significant advantage of this is that the vehicle does not need to be driven to a garage each time the release mechanism has been used.

Figure 7:
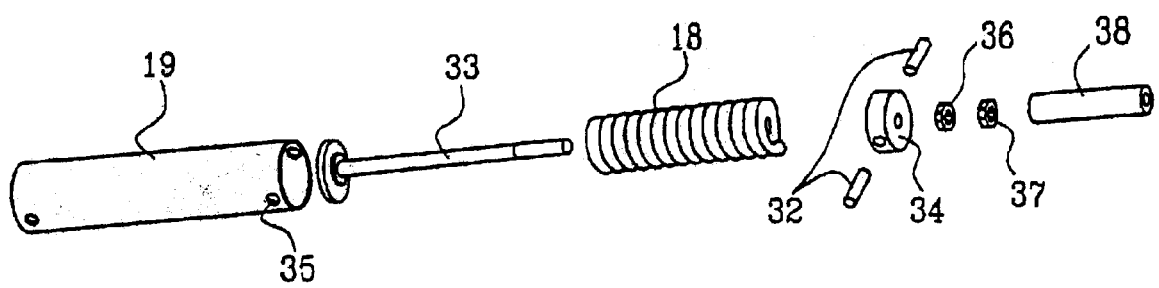
FIG. 7 is an exploded perspective of an energy storage spring package included in the brake activation unit according to FIG. 2.
Figure 8:
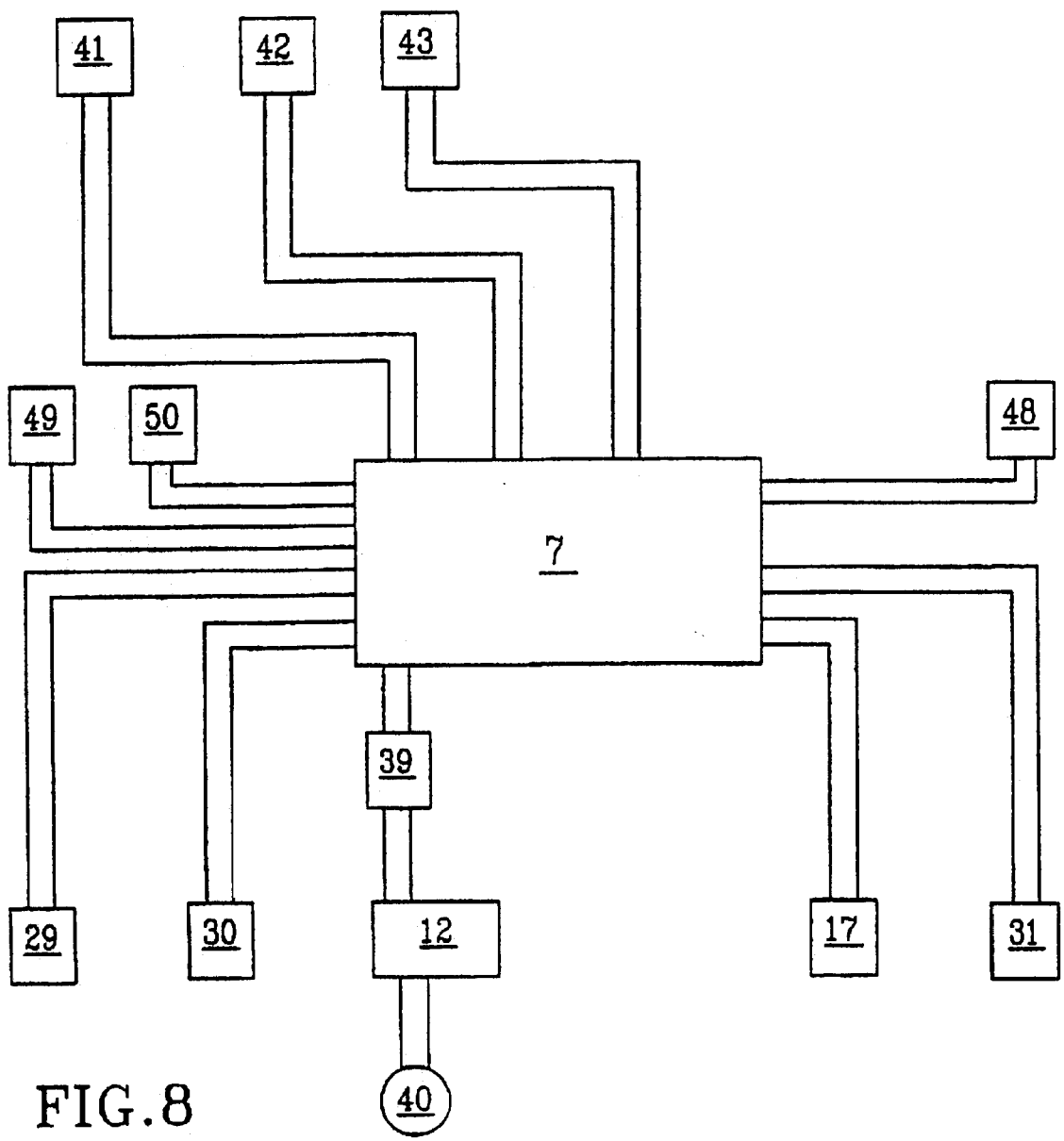
FIG. 8 illustrates one example of an appropriate electrical diagram for the parking brake according to the present invention.

The spring package according to FIG. 7, which as mentioned above is placed on the slide plate 9 and in terms of force connected to the other wire 3, consists of the outer cylinder 19, a rod 33 placed therein, the spring 18, a stop 34, the lock pegs 32 which are fastened to the stop 34 and in applied position extend out of the holes 35 in the outer cylinder for co-operation with the lock 27, a prestressing nut 36, a lock nut 37 and a wire tensioner 38, one end of which can be screwed tightly to the rod 33 and the other end of which is intended to be connected to the other wire 3. If the force in the wire 3 exceeds the force in the spring 18, the rod 33 can slide in the central hole in the stop 34.

The purpose of the spring 18 is to store energy for thermal changes and to be a position and energy reserve for relaxation in the system. The demands placed on the spring 18 are that it shall store energy from the forces that exceed the minimal locking force. Additionally, it shall be possible to deform it by an amount of the order of 5 mm.

As mentioned above and referring again to FIG. 1, the activation unit of the brake is contained in a plastic box 1 and attached to a chassis plate (not shown) equipped with a wire guide, not shown, to guide the wires 2, 3 correctly in relation to the slide plate 9. The whole activation unit with the chassis plate and surrounding plastic box 1 is easy to place in the vehicle. For the shortest wire routing, it is appropriately placed between the back wheels 4, 5 as shown in FIG. 1. The construction is well suited to positional control with the help of a knob according to the invention, since the lever arm 14 has a restricted rotational displacement, in the order of 0–195 degrees. Positional control is an advantage during dynamic braking.

Manually the parking brake is activated by turning the knob 6, which is appropriately placed in the middle console of the instrument panel. Deactivation is achieved by pressing the knob and rotating it back to its original position. For dynamic braking, the knob 6 can be turned continuously between released and fully applied.

The braking system is designed for a number of automatic functions. It shall be possible to apply the parking brake automatically when certain chosen conditions for the respective functions are fulfilled. The electrical diagram is shown in FIG. 7 with those components of the brake's automatic system that are controlled by the control unit 7. It is coupled via an ammeter 39 to the electric motor 12 and a potentiometer 40, which is a comparator for the position of the lever arm 14.

The micro-switch 30 that indicates applied brakes and the micro-switch 29 that indicates released brakes are connected to the control unit 7. Further, signals from a sensor 41 in the ignition lock, which indicates key in or key out, and signals from a presence detector 42 in the driver's seat such as a weight sensor, indicates whether there is a driver in the seat or not, are fed to the control unit 7. A torque sensor 43 provides information on when the motor is running. A micro-switch 31 indicates whether manual mechanical release has taken place. Information corresponding to the force in the wire is given to the control unit from a strain gauge 17.

A rotary potentiometer 48 is arranged to detect the position of the knob and send control signals proportional to the angle of the knob to the control unit 7 for continuous control of the brake force. The system also includes at least one end position sensor 49 for the knob, a sensor 50 in the door locks and sensors in the gear lever and brake pedal.

There are times when the brake must not release automatically. Examples include the following cases:

No driver in the driver's seat

The motor is running

The vehicle has been hit

There is no voltage or the voltage has just been applied

Electrical failure, short circuit

These cases may be realized using the sensor in the chair while the motor does not signal powering the vehicle.

The brake shall be applied automatically in the following cases:

When the car rolls backward

A forward gear (first gear) is engaged

The car rolls forward

Reverse gear is engaged

When the ignition key has been removed

Here, the sensor in the ignition lock is used. The control unit must also have information from the sensor in the gearbox for identification of the gear engaged, while the ABS system of the car provides the information that the car is in motion.

Further, it is important that the brake not apply itself in the following situations:

When being towed

When a wheel locks while the car is moving

When there is an electrical failure

It is therefore important to be able to disconnect the automatic control.

Figure 9:
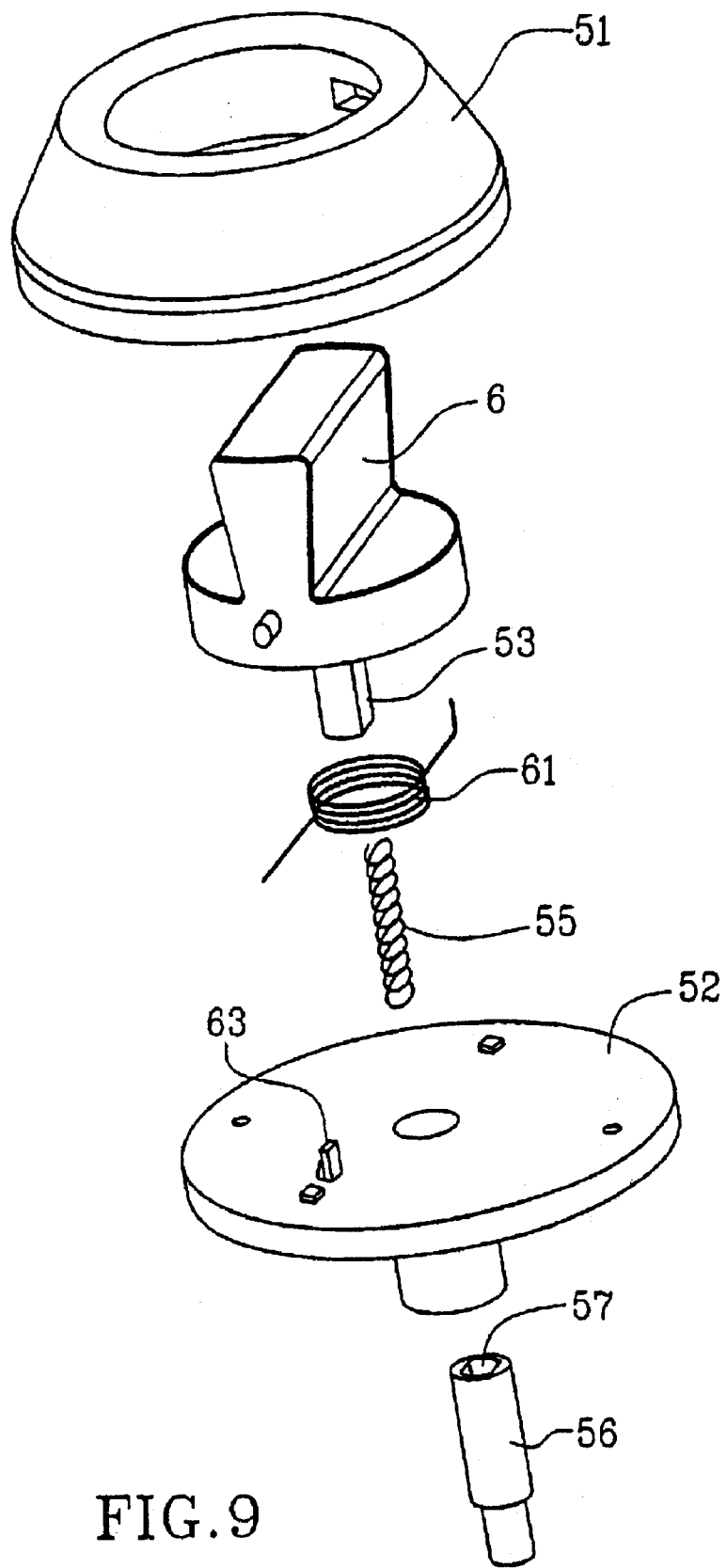
FIG. 9 is an exploded perspective from more of a top view of a knob according to the present invention.
Figure 10:
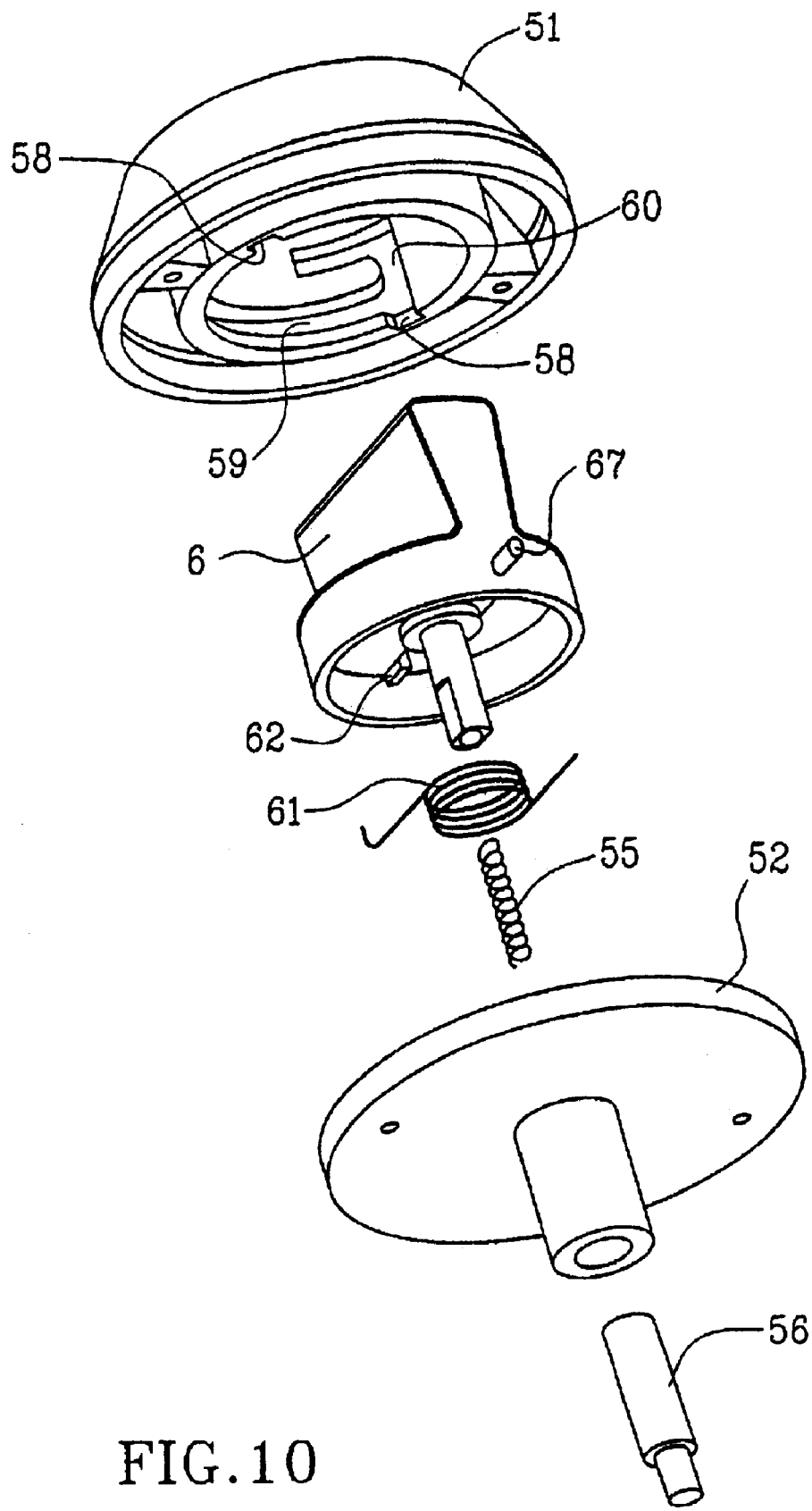
FIG. 10 is an exploded perspective from more of a bottom view of a knob according to the present invention.
Figure 11:
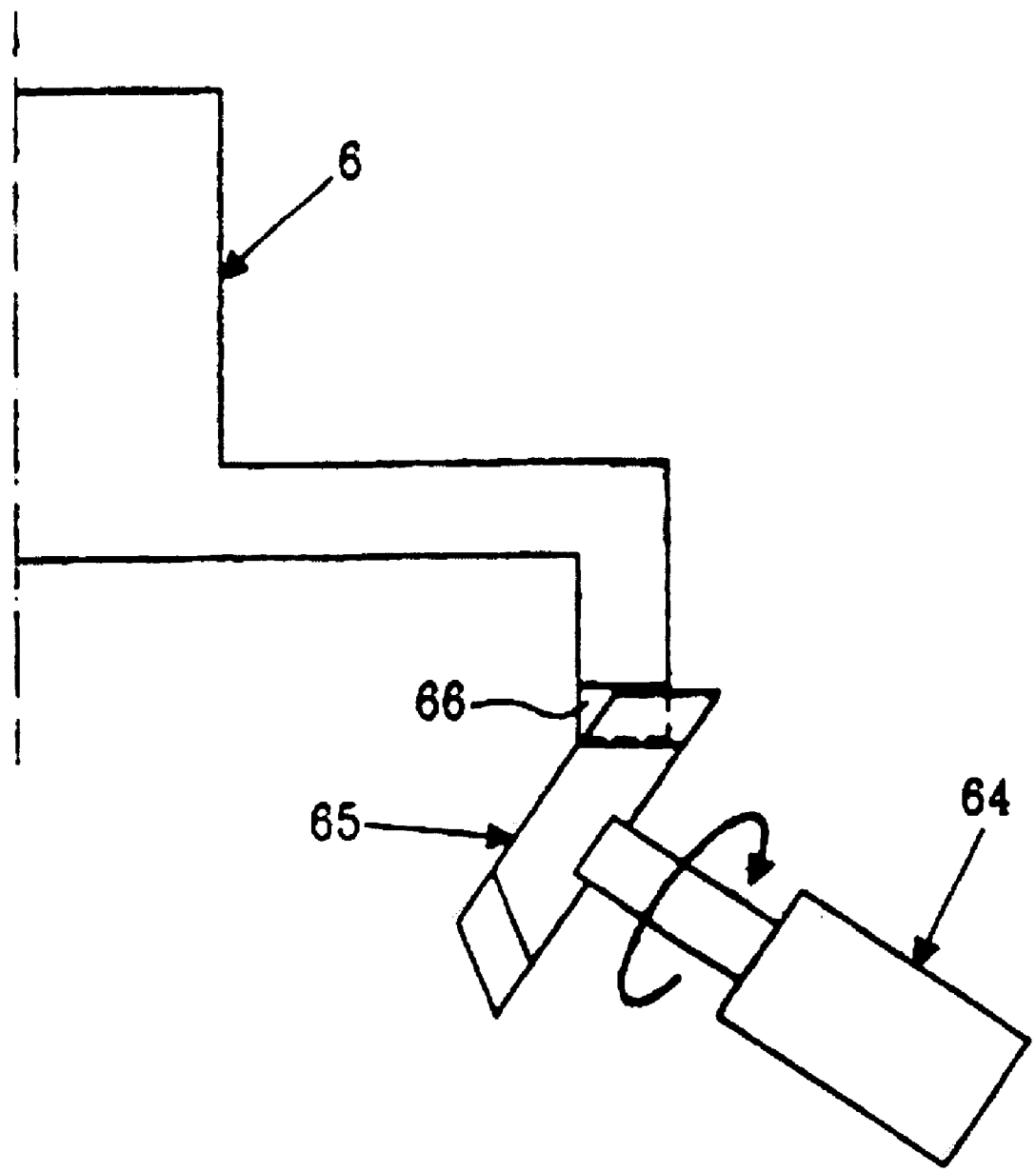
FIG. 11 is a schematic illustration of the automatic control of the knob according to the present invention.

The knob according to the invention is described in the following with reference to FIGS. 9–11. The knob 6 is placed in a housing 51 attached to a lower plate 52. An axle 53 (not round) is axially affixed to the rotation center of the knob 6. The axle 53 has a spring hole 54 for the pressure spring 55. The (not round) axle 53 is displaceably arranged in a sliding sleeve 56 that passes through the lower plate 52 and that has a hole that fits the (not round) axle 53. Rotation of the axle 53 relative to the sliding sleeve 56 is thereby prevented.

The knob 6 has two projecting guide pins 67 that are brought into the openings 58 when the knob is brought into the housing 51 and that are arranged to run in a slot 59 in the housing 51. This slot 59 is suitably long enough so that the knob 6 can be rotated in the order of 100 degrees between its released and fully applied positions. The housing 51 has an L-shaped groove part 60 arranged so that the guide pins 67 are opposite that guide part when the knob 6 has been rotated to the fully applied position.

When the guide pins 67 move in the slot 59, the pressure spring 55 is loaded and presses the knob upward. There is a torsion spring 61 between the knob 6 and the lower plate 52. The torsion spring 61 is attached between the spring holders 62 and 63 on the knob 6 and the lower plate 52, respectively, and arranged to oppose rotation of the knob 6 from its released position to its said fully applied position.

When the knob 6 is fully tightened, it is pressed axially upward by the pressure spring 55 whereby the guide pins 67 move in the L-shaped groove part 60. When the knob 6 has been pressed axially to the bottom of the groove part 60, the torsion spring 61 forces the knob 6 to rotate backward a little whereby the guide pins 67 go into a locked position in the L-shaped groove.

To bring the knob 6 out of its locked position, which corresponds to a fully applied parking brake, the knob 6 must first be rotated a little against the action of the torsion spring 61 and thereafter moved axially against the pressure spring 55. This results in very good child safety.

The position of the knob 6 is sensed by a rotary potentiometer (not shown). This potentiometer is arranged to both sense the rotation of the sliding sleeve 56 and send control signals to the electric motor 12 for proportional rotation of the lever arm 14 for tightening or releasing the brake wire 2.

As mentioned above the parking brake has a number of automatic functions. For example the parking brake is set automatically when the key is taken out of the ignition lock.

To correctly show that the parking brake has been activated, there is included in the invention a control motor 64 that starts automatically and maneuvers the knob to the fully applied mechanically locked position. This function is shown schematically in FIG. 11. The control motor,64 powers a conical gear 65. It is arranged to engage and disengage gear teeth 66 on the knob 6 via a solenoid. The solenoid's displacement of the gear 65 is controlled by the control unit depending on input signals from sensors. Examples of such sensing functions are a sensor in the ignition lock and a presence detector in the driver's seat. When the driver leaves the driver's seat and when the key is taken out of the ignition lock these sensors produce control signals for applying the parking brake and, simultaneously via the control unit, also produce control signals to the solenoid for moving it so that the gear engages the gear wheel on the knob thereby bringing the knob to its locked position. The maneuver knob 6 is appropriately somewhat larger that other controls on the instrument panel. For comfortable use, a control knob diameter of altogether about 7 cm is appropriate.

The electric braking unit can be of a different type to that which has been described above in connection with FIGS. 2–7. For example, the braking units need not be activated by wires but can be electromechanical brakes applied directly to the respective wheel.

Although the present invention has been described and illustrated in detail, it is to be clearly understood that the same is by way of illustration and example only, and is not to be restricted to the above described embodiments. Rather, many modifications are possible within the scope of the appended claims.

What is claimed is:

1. A knob arrangement for operating parking brakes intended for use in vehicles comprising brake units such as drum brakes or disc brakes on two opposing wheels in a pair of wheels, and an electrically powered tightening means for applying and releasing braking force to the brake units, the knob arrangement comprising:

a sensing means for sensing the position of a knob associated with a parking brake lever, the sensing means adapted to send control signals to a first electric motor arranged to power the tightening means for generating a braking force corresponding to the sensed position of the knob, the knob being manually adjustable, and, in a fully applied position that corresponds to maximal braking force, being mechanically lockable;

a control motor arranged to automatically displace the knob to the fully applied and mechanically locked position dependent upon a second control signal being applied to the motor, and the knob, when in the fully applied and locked position, being releasable therefrom by manual operation.

2. The knob arrangement according to claim 1, wherein the sensing means is a rotary potentiometer.

3. The knob arrangement according to claim 2, further comprising:

the knob being located in a housing that is fastened to a lower plate and the knob having a non-round axle at a rotation center thereof;

the axle having a spring hole for a pressure spring and the non-round axle being arranged to move in a sliding sleeve positioned to extend through the lower plate and which has a hole that fits to the axle whereby relative rotation of the axle and the sliding sleeve is prevented while simultaneously the sliding sleeve follows the rotation of the knob;

the knob being placed to rotate in the housing between a first position, in which the parking brake is released, and a second position in which the parking brake is fully applied, and, when the knob is in the second position, the knob can be displaced axially away from the lower plate and after said axial displacement, the knob can be rotated back slightly into a locked position; and the pressure spring being arranged to press the knob in the axial direction of displacement, and a torsion spring being arranged to oppose the rotation of the knob from a released position to a fully applied position and, after the axial displacement of the knob, being pressed into the locking position.

4. The knob arrangement according to claim 1, further comprising:

a control unit arranged to control the first electric motor and the control motor dependent on input signals from a plurality of sensors.

5. The knob arrangement according to claim 4, wherein the plurality of sensors comprises:

the position sensing means of the knob, a sensor in the ignition lock indicating whether the ignition key is inserted, and a sensor for indicating whether the parking brake is applied.

6. The knob arrangement according to claim 3 wherein the plurality of sensors comprises:

a presence detector at the driver's seat that is coupled to the control unit, the presence detector adapted to indicate whether the driver is sitting in the driver's seat.

7. The knob arrangement according to claim 4, further comprising:

a sensor in the door lock that is coupled to the control unit for providing information on whether the doors are locked.

8. The knob arrangement according to claim 4, further comprising:

sensors at the brake pedal and at the clutch pedal each of which are connected to the control unit for providing information on whether the respective pedals are activated.

9. The knob arrangement according to claim 1, further comprising:

the control motor being arranged to drive a gear wheel via a solenoid engagable with gear teeth on the knob for rotating the knob, the solenoid's displacement of the gear wheel being controlled by the control unit depending on input signals from sensors included in the arrangement.

10. An arrangement for operating a vehicular parking brake, the arrangement comprising:

a vehicle having a brake unit associated with a wheel of the vehicle; an electrically powered tightener configured to apply and releasing braking force to the brake unit;

a sensor configured to sense the position of a knob associated with a parking brake lever, the sensor being further adapted to send control signals to a first electric motor arranged to power the tightener for generating a braking force corresponding to the sensed position of the knob, the knob being manually adjustable, and, in a fully applied position that corresponds to maximal braking force, being mechanically lockable;

a control motor configured to displace the knob to the fully applied and mechanically locked position based on a control signal sent to the motor; and the knob, when in the fully applied and mechanically blocked position, being exclusively releasable therefrom by manual operation.

* * * * *